United States Patent [19]
Cudak et al.

[11] Patent Number: 5,640,430
[45] Date of Patent: Jun. 17, 1997

[54] METHOD FOR DETECTING VALID DATA IN A DATA STREAM

[75] Inventors: Mark C. Cudak, McHenry; Donald G. Newberg, Schaumburg; Bradley Hiben, Glen Ellyn; Robert D. LoGalbo, Bartlett, all of Ill.

[73] Assignee: Motorola, Inc., Schaumburg, Ill.

[21] Appl. No.: 116,197

[22] Filed: Sep. 2, 1993

[51] Int. Cl.$^6$ .................................................. H04B 1/06
[52] U.S. Cl. .......................... 375/343; 455/383; 455/343; 364/724.01
[58] Field of Search .................... 455/34.2, 38.3, 455/343; 375/365, 367, 368, 343, 366, 342, 355, 340, 224–225, 317–319, 350; 370/105.4, 106, 84, 311; 327/91, 90, 94, 96; 364/724.01; 379/60, 63

[56] References Cited

U.S. PATENT DOCUMENTS

| 4,376,309 | 3/1983 | Fenderson et al. | 375/348 |
|---|---|---|---|
| 4,755,795 | 7/1988 | Page | 340/347 |
| 4,811,362 | 3/1989 | Yester, Jr. et al. | 455/343 |
| 4,961,073 | 10/1990 | Drapac et al. | 455/343 |
| 5,027,428 | 6/1991 | Ishiguro et al. | 455/343 |
| 5,280,650 | 1/1994 | Sobti | 455/343 |
| 5,301,225 | 4/1994 | Suzuki et al. | 455/343 |
| 5,341,404 | 8/1994 | Sevenhans et al. | 375/355 |
| 5,420,450 | 3/1995 | Lennen | 375/343 |
| 5,509,034 | 4/1996 | Beukema | 375/344 |
| 5,577,056 | 11/1996 | Malik et al. | 371/57.2 |

*Primary Examiner*—Wellington Chin
*Assistant Examiner*—William Luther
*Attorney, Agent, or Firm*—George C. Pappas; James A. Coffing

[57] ABSTRACT

In a digital communication system, communication units may reduce power consumption while attempting to detect reception of valid data by sampling and filtering a data stream at a first sampling rate producing a first filtered data stream. When the first filtered data stream indicates potential valid data, the communication unit samples and filters the data stream at a second sampling rate, wherein the second sampling rate is greater than the first sampling rate and consumes more power, producing a second filtered data stream. The communication unit determines whether the data stream contains valid data based on the second filtered data stream.

6 Claims, 2 Drawing Sheets

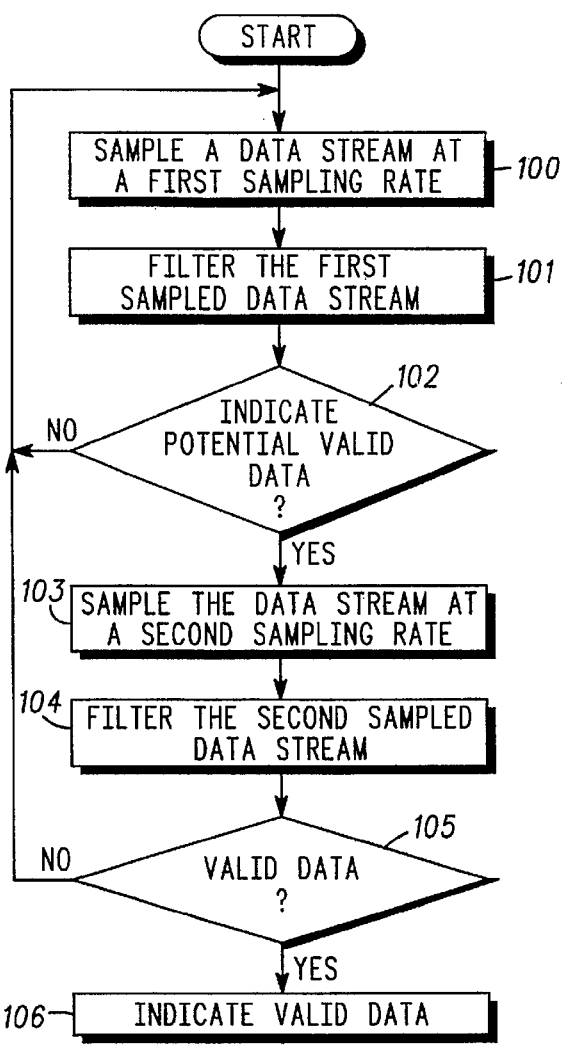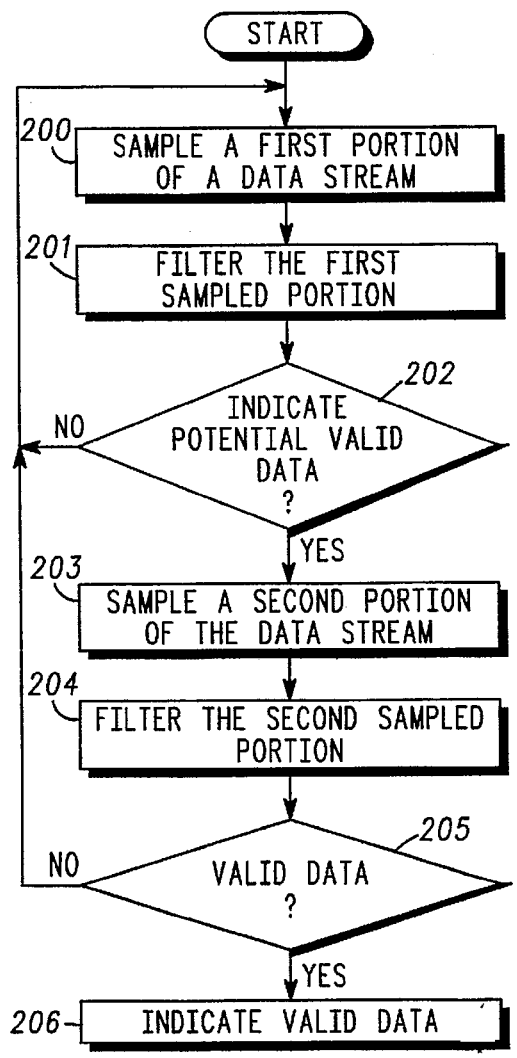

METHOD FOR DETECTING VALID DATA IN A DATA STREAM

FIELD OF THE INVENTION

The present invention relates generally to communication units and, in particular, to reducing power consumption in communication units.

BACKGROUND OF THE INVENTION

Communication units, which may be portable, mobile, or cellular radio/telephones, communicate voice or data information to other communication units or landline communication units via a communication resource. During idle mode of operation, digital communication units continuously search for an incoming message via a correlation sequence to detect a known pattern indicating the beginning of the incoming message. The correlation sequence, or data detection process, is typically a complex algorithm performed by a processor on board the communication unit. Due to its complexity, the data detection process imposes great processing demands on the processor which results in current drain of the communication unit. Greater current demands result when the data detection processing is performed by a digital signal processor (DSP). Since the communication unit is in the idle mode of operation most of the time, the processor is performing the data detection process most of the time, resulting in an enormous demand on the processor. The greater the processing demand imposed on the DSP, the greater the current drain which results in a shortened battery life.

Therefore, a need exists for a method of data detection processing that minimizes processor loading, reduces current drain, and, thus, increases battery life.

BRIEF DESCRIPTION OF THE DRAWINGS

FIG. 1 illustrates a logic diagram that a communication unit may use to implement the present invention.

FIG. 2 illustrates an alternate logic diagram that a communication unit may use to implement the present invention.

DESCRIPTION OF A PREFERRED EMBODIMENT

Figure 3:
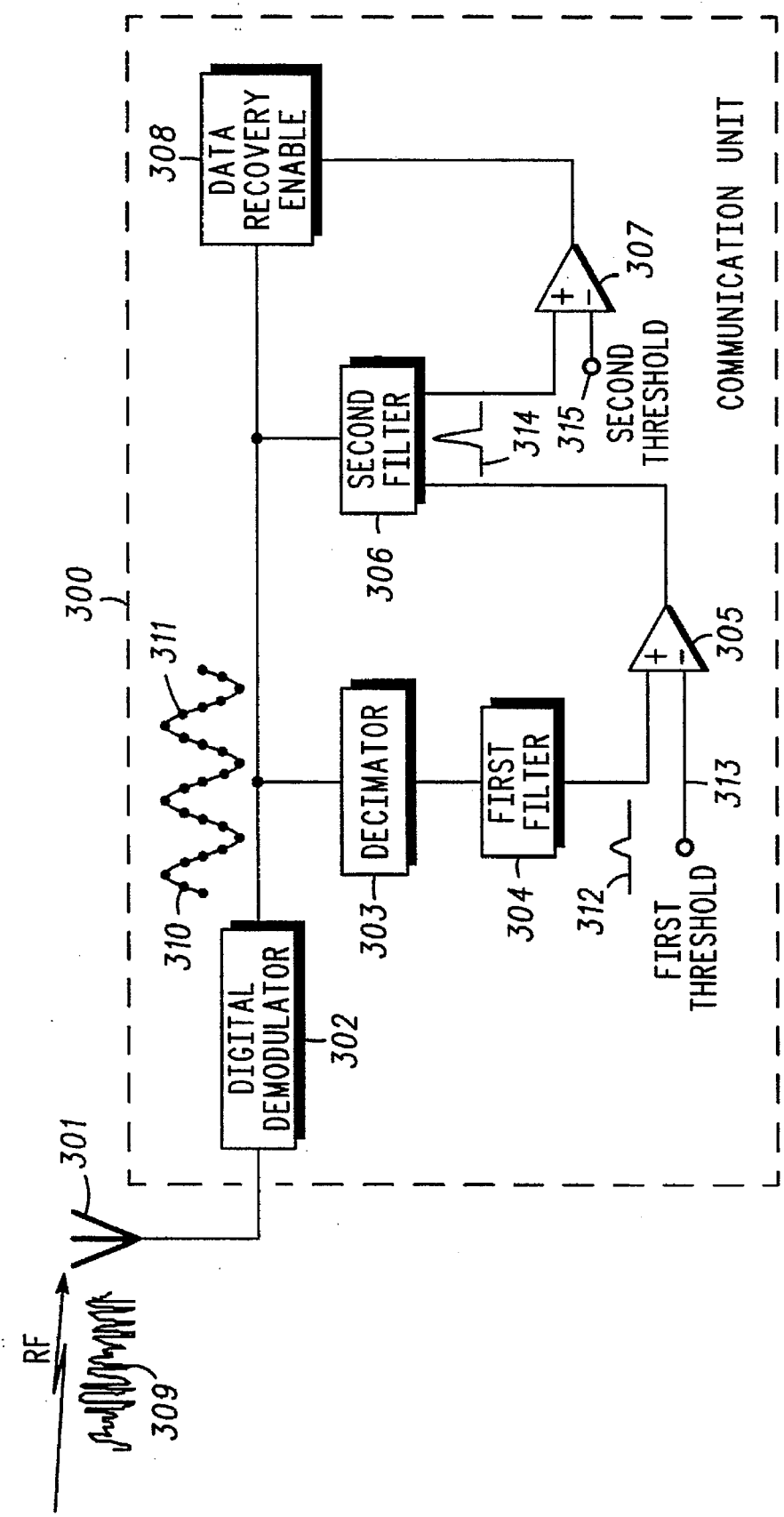
FIG. 3 illustrates a communication unit in accordance with the present invention.

Generally, the present invention provides a method for communication units to reduce power consumption while attempting to detect reception of valid data. Valid data is assumed to be a data stream that contains a known pattern inserted for detection purposes. Data streams that do not contain this detection pattern are considered to be invalid data. As such, communication units reduce power consumption by performing a preliminary detection process using less than the optimal amount of input data. If this preliminary test indicates the possibility of valid data, the full detection process is performed using all of the available data. With such a method, the power consumption of a communication unit is greatly reduced by only performing the full data detection processing when there is a high probability that valid data is being received.

The present invention can be more fully described with reference to FIGS. 1–3. FIG. 1 illustrates a logic diagram that a communication unit may use to implement the present invention. At step 100 a data stream is sampled at a first sampling rate that is lower than the optimal detection sample rate producing a first sampled data stream. Generally, this lower rate sampling is accomplished by decimating the input data (using only every nth sample). The lower sampling rate must be high enough, however, so that at least one sample of a filtered output (step 101) falls on a correlation peak (step 102). Thus, the minimum sampling rate is dependent on the expected width of the correlation peak but typically lies in the range of ⅛ to ½ of the optimum sampling rate. For example, if the necessary sampling rate is 400 kHz, then the first sampling rate would be between 50 kHz–200 kHz. Note that the processing of each sample incurs current drain on the device, therefore, the more samples processed, the greater the current consumption. Thus, reducing the number of samples, results in a reduction of current and power consumption. Also note that the data stream may be a continuous stream of data or a plurality of separate data messages.

After the data stream has been sampled, the first sampled, or decimated, data stream is filtered by passing through a pattern matching (correlation) filter to produce a first filtered data stream (101). The shape of the filter matches the expected shape of the known detection pattern at the first, or lower, sampling rate. The output of the filter indicates how well the received data matches the expected data. When the known detection pattern is present, the output of the filter produces a correlation peak that rises above an output that typically occurs when potential valid data is not present, i.e. rises above a first predetermined threshold.

The first filtered data stream is compared to the first predetermined threshold to determine whether the data stream contains potential valid data (102). If the output of the filter is unfavorable with respect to the first predetermined threshold (e.g. below the threshold), the data stream does not contain potential valid data and the process returns to sampling a data stream at the first sampling rate (step 100). If the output of the filter is favorable with respect to the first predetermined threshold (e.g. above the threshold), the first sampled data stream indicates potential valid data and more conclusive tests are performed. Note that because the filtering is performed at a lower than optimal rate, the correlation peak produced by the first sampled data is generally less than that which would have been produced when sampling at the optimal rate. Thus, when the output of the filter is above the first predetermined threshold, this only indicates that the data stream contains potential valid data. Additionally, the first filtered data stream may be compared to a second predetermined threshold, wherein the second predetermined threshold is greater than the first predetermined threshold and is set at such a level that typically, only the optimal testing of the data stream would exceed. If the first filtered data stream is favorable with respect to the second predetermined threshold (e.g. greater than the threshold), the data stream is considered to contain valid data and the process ends.

However, it is not anticipated that the first filtered data stream would be favorable with respect to the second predetermined threshold very often (i.e. that the first sampling rate will have samples at or near the center of the correlation peak). Thus, when the first filtered data stream is unfavorable with respect to the second predetermined threshold, or is not compared to a second predetermined threshold, the process continues at step 103. The data stream is sampled at a second, optimal, sampling rate to produce a second sampled data stream (103). The optimal rate is such that it is guaranteed that at the output of the second filtering process (step 104), a sample will lie at or near the center of the correlation peak (step 105) (discussed below). This requirement insures that valid data can be differentiated from invalid data with the highest possible probability. Continuing with the above example, the second sampling rate would be the necessary sampling rate of 400 kHz.

The second sampled data stream is filtered (passed through a pattern matching filter) to produce a second filtered data stream (104). The filter is generally similar to the filter used in step 101, differing only in that it matches the expected shape of the known detection pattern at the higher sampling rate. Again, when the known detection pattern is present, the output of the filter produces a well defined peak. Note that this peak is generally generated with a higher resolution than in step 101 due to the higher sampling rate. Thus, the peak value can be determined more accurately.

The second filtered data stream, peak value, is compared to the second predetermined threshold. The second predetermined threshold is chosen such that most or all peaks that result from valid data will be favorable with respect to the second predetermined threshold (e.g. greater than the threshold). In a well designed system, most or all of the peaks corresponding to invalid data will be unfavorable with respect to the second predetermined threshold (e.g. fall below the threshold). Thus, filtered data streams that produce correlation peaks above the second predetermined threshold indicate valid data. Filtered data streams that produce correlation peaks below the second predetermined threshold indicate invalid data and the process returns to step 100.

When the filtered data stream is valid data (105), the communication unit indicates the presence of valid data and higher level processes are enabled to process the valid data (106). These higher level processes may include such processes as bit recovery or audio processing. Note that the location of the correlation peak may also be used at this stage to provide phase information needed for initialization.

FIG. 2 illustrates an alternate logic diagram that a communication unit may use to implement the present invention. At step 200 a first portion of a data stream is sampled with a length that is shorter than an optimal detection length producing a first sampled portion. Generally, this is accomplished by using a short segment of the data stream. This shorter length must be long enough, however, so that at least one sample of filtered output (step 201) falls on a correlation peak (step 202). Thus, the minimum length is dependent on the expected height of the correlation peak but typically lies in the range of ⅛ to ½ of the optimum length. As mentioned previously, note that the processing of each sample incurs current drain on the device, therefore, the more samples the greater the current consumption. Thus, reducing the number of samples results in a reduction of current draw and power consumption.

After the first portion of the dam stream has been sampled, the first sampled portion is filtered by passing through a pattern matching (correlation) filter to produce a first filtered portion. The shape of the filter matches the expected shape of the known detection pattern at the shortened length. The output of the filter indicates how well the received data matches the expected data. When the known detection pattern is present, the output of the filter produces a correlation peak that rises above an output that typically occurs when potential valid data is not present, i.e. rises above a first predetermined threshold.

The first filtered portion is compared to the first predetermined threshold to determine whether the data stream contains potential valid data (202). The comparison is similar to the comparison of step 102 of FIG. 1, thus, no further discussion will be presented. If the first filtered portion is unfavorable with respect to the first predetermined threshold (202), the data stream does not contain potential valid data and the process returns to sampling a portion of a data stream (200). If the first filtered portion is favorable with respect to the first predetermined threshold (202), the data stream may contain potential valid data and a second portion of the data stream is sampled at a second, optimal length producing a second sampled portion (203). The optimal length of the second portion is such that it guarantees that the output of a second filtering process (step 204), will have a sample that lies at or near the center of a correlation peak (step 205) (discussed below). This requirement insures that valid data can be differentiated from invalid data with the highest possible probability. In one embodiment, generally, the second portion incorporates the entire expected detection pattern, including the first sampled portion.

The second sampled portion is filtered (passed through a pattern matching filter) producing a second filtered portion (204). The filter is generally similar to the filter used in step 201, differing only in that it matches the expected shape of the known detection pattern at the longer length. Again, when the known detection pattern is present, the output of the filter produces a well defined correlation peak. Note that the correlation peak is generated with a higher resolution than in step 201 due to the larger number of data points used. Thus, a peak value can be determined more accurately.

The second filtered portion is compared to a second predetermined threshold which is generally greater than the first predetermined threshold to determine whether the data stream is potential valid data (205). The comparison is similar to the comparison of step 105 of FIG. 1, thus, no further discussion will be presented. If the second filtered portion is unfavorable with respect to the second predetermined threshold (205), the data stream does not contain valid data and the process returns to sampling a smaller portion of a data stream (200). If the second filtered portion is favorable with respect to the second predetermined threshold (205), the communication unit indicates the presence of valid data and higher level processes are enabled to process the valid data (206). The higher processes may include such processes as bit recovery or audio processing. Note that the location of the correlation peak may also be used at this stage to provide phase information needed for initialization.

As a working example of the logic diagram of FIG. 1, consider FIG. 3 which illustrates a communication unit that includes an antenna (301) and a digital signal processor (300) having, a digital demodulator (302), a sample rate decimator (303), a low sample rate correlation filter (304), an initial threshold detector (305), a high sample rate correlation filter (306), a final threshold detector (307), and a data recovery process enable (308).

A radio frequency (RF) signal (309) is received at the antenna (301) and processed by the digital demodulator (302) to produce a sampled version of the baseband signal (310). The signal will generally be sampled at the higher of the two sampling rates used in the following process. Each time a new sample is generated, the decimator (303) is run on the L newest samples, where L is the expected length of the detection pattern. The decimator (303) selects every $N^{th}$ sample where N is the decimation rate, typically 2-8. This produces output M where M=L/N samples long. This M-sample data stream is then passed through the first filter (304) which is shaped to match the expected detection pattern at the lower sampling rate. When the detection pattern is not present, the output (312) of the first filter (304) contains small values that are random in nature. When the detection pattern is present, the output (312) is a small but well defined peak. Each time the first filter (304) is run, its output value (312) is compared to a first predetermined threshold (313). If the output (312) is below the first predetermined threshold (313), the algorithm terminates the current data detection processing and waits for a new sample to arrive.

If the output (312) is above the first predetermined threshold (313), the algorithm passes the original L samples through a second filter (306) which runs at the higher sampling rate. The second filter (306) is shaped to match the expected detection pattern at the higher sampling rate. When the detection pattern is not present, the output (314) of the second filter (306) contains small values that are random in nature. When the detection pattern is present, the output (314) is a large well defined peak. Each time the second filter (306) is run, its output value (314) is compared to a second predetermined threshold (315). If the output (314) is below the second predetermined threshold(3 15), the algorithm terminates the current data detection processing and waits for a new sample to arrive. If the output (314) is above the second predetermined threshold (315), valid data is present and the data recovery process is enabled.

The present invention provides a method for communication units to reduce power consumption while attempting to detect reception of valid data. With such a method, a battery operated communication unit can conserve valuable energy and thus increase its battery life. The energy, in the form of current, is conserved by only sampling a portion of a received stream of data in search of valid dam, where current is consumed for each sample taken. When the minimal sampling indicates the potential for valid data, the necessary sampling rate is used to accurately verify the data. Thus, only minimal current draining samples are taken until there is a high likelihood that the data stream contains valid data. In contrast, prior art communication units, when searching for valid data, continually used the necessary sampling rate, and consumed much more energy than a communication unit incorporating the present invention.

We claim:

1. In a communication unit including a digital signal processor (DSP), a DSP-implemented method for minimizing power consumption by the communication unit, the method comprising the steps of:
  a) sampling a data stream at a first sampling rate to produce a first sampled data stream;
  b) using a first correlation filter, filtering the first sampled data stream to produce a first correlation peak, whereby the first correlation peak indicates how well the first sampled data stream matches a predetermined detection pattern at the first sampling rate, the first correlation filter being based on the predetermined detection pattern at the first sampling rate:
  c) identifying whether the first correlation peak exceeds a first predetermined threshold;
  d) when the first correlation peak exceeds the first predetermined threshold, sampling the data stream at a second sampling rate to produce a second sampled data stream, wherein the second sampling rate is greater than the first sampling rate;
  e) using a second correlation filter, filtering the second sampled data stream to produce a second correlation peak as a function of the predetermined detection pattern at the second sampling rate; and
  f) identifying a valid data condition when the second correlation peak exceeds a second predetermined threshold and a non-valid data condition when the second correlation peak does not exceed the second predetermined threshold.

2. The method of claim 1 further comprising the step of sampling a second data stream at the first sampling rate when the non-valid data condition is identified.

3. The method of claim 1, including a subsequent step of enabling a data recovery process when the valid condition is identified.

4. In a communication unit including a digital signal processor (DSP), a DSP-implemented method for minimizing power consumption by the communication unit, the method comprising the steps of:
  a) sampling a first portion of a data stream to produce a first sampled portion;
  b) filtering, the first sampled portion to produce a first correlation peak, whereby the first correlation peak indicates how well the first sampled portion matches a predetermined detection pattern;
  c) identifying when the first correlation peak indicates a potential match condition of the predetermined detection pattern based on when the first correlation peak exceeds a first threshold;
  d) when the first correlation peak indicates the potential match condition sampling a second portion of the data stream to produce a second sampled portion, wherein the second sampled portion includes the first sampled portion and a greater portion of the data stream than the first sampled portion, and wherein the second sampled portion has an optimal length with respect to a second pattern matching filter;
  e) filtering the second sampled portion to produce a second correlation peak; and
  f) identifying a valid data condition when the second correlation peak exceeds a second predetermined threshold and a non-valid data condition when the second correlation peak does not exceed the second predetermined threshold.

5. The method of claim 4, further comprising the step of sampling a subsequent portion of the data stream when the non-valid condition is identified.

6. The method of claim 4, including a subsequent step of enabling a data recovery process when the valid condition is identified.

* * * * *